(No Model.)
J. F. DUNNIGAN.
FLOWER HOLDER FOR BICYCLES.
No. 591,390. Patented Oct. 12, 1897.
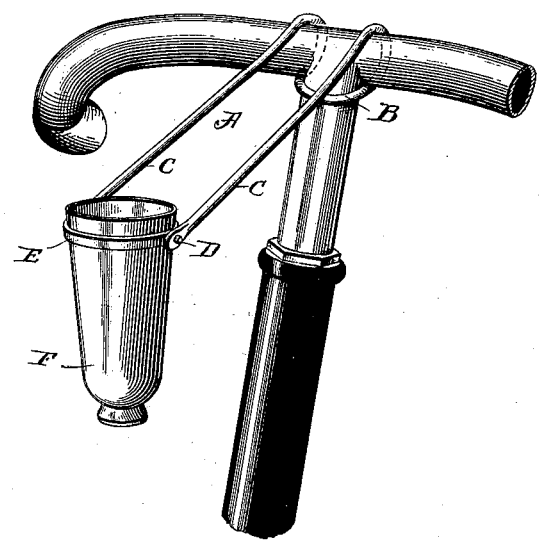

UNITED STATES PATENT OFFICE.

JAMES F. DUNNIGAN, OF GREENFIELD, MASSACHUSETTS.

FLOWER-HOLDER FOR BICYCLES.

SPECIFICATION forming part of Letters Patent No. 591,390, dated October 12, 1897.

Application filed December 5, 1896. Serial No. 614,633. (No model.)

*To all whom it may concern:*

Be it known that I, JAMES F. DUNNIGAN, a citizen of the United States, residing at Greenfield, in the county of Franklin and State of Massachusetts, have invented a new and useful Improvement in Flower-Holders for Bicycles, of which the following is a specification.

My invention relates to a new and useful improvement in vases or other like parcel-carriers for bicycles, and has for its object to provide a simple, cheap, and effective device for the support of flowers and the like upon bicycles which may be easily detached therefrom or attached thereto, as occasion requires.

With these ends in view my invention consists in the details of construction and combination of elements hereinafter set forth, and then specifically designated by the claims.

In order that those skilled in the art to which this invention appertains may understand how to make and use the same, I will describe its construction and operation in detail, referring by letter to the accompanying drawing, forming a part of this specification, which represents a portion of the handle-bars of a bicycle with my improvement attached thereto.

In carrying out my invention I provide a support A, which is formed of a single piece of wire so bent as to provide a loop B and the extending arms C. In the outer end of these arms are formed holes which serve for the reception of the pivoting-points D, the latter projecting from the ring E.

F represents the holder, which may be of any suitable design, such as a vase made of sheet metal or wire-gauze, and when of the former serves to hold a sufficient quantity of water to supply the flowers filled therein with a quantity of moisture for their preservation.

My improvement is attached to the handle-bars of a bicycle by springing the arms C apart sufficiently to release the ring, after which said arms are passed beneath the handle-bars and around the post, when, by turning them upward and over, the loop B will be brought into contact with said post, in which position the device will be supported, as clearly shown in the drawing. By again swinging the arms open the ring may be secured therebetween, after which the vase or holder is passed within the ring, and the device is complete.

To detach my improvement from the bicycle, the reverse steps are followed to those just described, so that it will be seen that the holder may be quickly attached to or detached from the handle-bars of a bicycle.

When in use, this device serves as a holder for flowers and enables a person to carry the same for a considerable length of time without their losing their freshness, which will add pleasure and comfort to the rider. One of the advantages of my improvement is that its cost of construction is very small, and it may therefore be used by every bicycle-rider.

I am aware that my improvement may be put to other use besides the holding of flowers—as, for instance, it may be made of a size and design to hold cologne or other toilet articles, in which case the holder would be provided with a cover, or said holder may be made the shape of a bucket, having a threaded stopper therefor.

Having thus fully described my invention, what I claim as new and useful is—

1. A flower-holder consisting of two arms secured to a bicycle, a ring detachably pivoted between the arms and a holder carried by said ring, as and for the purpose described.

2. A flower-holder consisting of a single piece of wire bent to form a loop, the loop end being bent to form a hook, and a ring detachably pivoted between the arms of the loop, substantially as described.

3. A flower-holder consisting of a single piece of wire bent to form two parallel arms, the loop end of said arms being bent to produce a hook, a ring detachably pivoted between the outer ends of said arms and a receptacle fitted in said ring, substantially as described.

4. A flower-holder consisting of a wire loop, and a ring detachably pivoted between the arms of the loop, substantially as described.

5. A flower-holder consisting of a single piece of wire doubled to produce arms running in the same direction, the loop end of said arms being bent to form a hook, a ring, lugs formed on opposite sides of the ring, and inserted in openings of the arms, and a receptacle fitted in the ring, substantially as described.

In testimony whereof I have hereunto affixed my signature in the presence of two subscribing witnesses.

JAMES F. DUNNIGAN.

Witnesses:
  S. S. WILLIAMSON,
  HERBERT O. EDGERTON.